Patented Dec. 13, 1949

2,491,410

UNITED STATES PATENT OFFICE 2,491,410

GRAPHITE-FREE TITANIUM CARBIDE AND METHOD OF MAKING SAME

Charles C. Laughlin and Eugene Wainer, Niagara Falls, N. Y., assignors, by mesne assignments, to National Lead Company, New York, N. Y., a corporation of New Jersey No Drawing. Application July 23, 1945, Serial No. 606,706

2 Claims. (Cl. 106—43)

The present invention relates to the preparation of a new titanium carbide of superior hardness and more particularly to a graphite free titanium carbide containing a small amount of chromium.

Commercial titanium carbide as presently manufactured has a number of major uses in view of its great hardness. It is used as an ingredient of high speed cutting tools usually in combination with tungsten carbide but sometimes in its absence; as a base for electrical contact points; as an ingredient of heat-resisting compositions, and others.

The present process for producing titanium carbide involves heating a mixture of titanium oxide and carbon to 1800° C. or higher. The product obtained invariably contains several percent of free carbon in the form of graphite. The presence of free graphite in amounts over 0.2% sharply reduces the utility of the product, the hardness is reduced and the product disintegrates readily on application of heat. When used as a contact point, unequal electrical and thermal stresses are developed leading to disintegration. In general, rather involved procedures are required to eliminate the free carbon, which procedures are generally costly and, as often as not, unsuccessful in operation.

In order to obtain any benefit from the use of titanium carbide in a cutting tool, the free carbon must be reduced below 0.2%, such a product being called a "graphite-free" titanium carbide in the trade. Such a graphite-free product imparts the necessary toughness, hardness, and durability to the finished product required for utility, whereas the graphite-containing product, especially if it contains one to three percent of graphite, as it usually does, is practically useless or of very limited utility in these respects.

It is an object of the present invention to prepare titanium carbide as an initial reaction product which meets the specification of a "graphite-free" product, that is, a product in which the graphite content is negligibly low.

It is also an object of the invention to include in the reaction mixture employed to manufacture titanium carbide a material which will eliminate graphite from the mixture at the temperature of operation.

It is also an object of the invention to make unnecessary the after treatments presently employed to reduce the free carbon or graphite of titanium carbide to manufacture the so-called "graphite-free" product of commerce.

It is also an object of the invention to prepare a titanium carbide having a small predetermined amount of chromium therein and a product of superior hardness, toughness and durability as compared with graphite free titanium carbide prepared by elutriation procedures.

The novel product of the present invention is prepared by heating a mixture of titanium oxide and carbon of the approximately proper stoichiometric proportions to produce titanium carbide and, the addition, to the mixture of a small amount of chromium oxide. The temperatures of the reaction are in the range 3600° F. to 4000° F.

The general equation for the formation of titanium carbide is as follows:

$$TiO_2 + 3C \rightleftharpoons TiC + 2CO$$

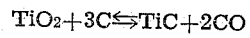

However, free graphite is always present.

This free graphite is obtained in three ways:

1. By reversal of the reaction which reversal takes place readily.

2. By performing the reaction at too high a temperature. Under these conditions, TiC dissolves carbon very readily which, on cooling, precipitates as graphite. The temperatures of active formation and fusion of TiC are so close together it is practically impossible to prevent this solution of carbon. This is the most important source of free graphite.

3. An incomplete reaction due to improper time temperature relations.

We have found that the addition of chromium oxide or compounds of chromium to the reaction mixture of titanium oxide and carbon has a peculiar and highly beneficial effect. Apparently, chromium compounds form complexes with carbon which are at least partially volatile at the temperature of rapid formation of titanium carbide. If the process be carried out in a closed container, a sublimate is obtained on the cooler portions of the receptacle consisting chiefly of chromium carbide. In view of the boiling out of the free carbon as a chromium complex at reaction temperatures, the most important source of free graphite is automatically eliminated with respect to the titanium derivative. A portion of the chromium, however, always remains behind.

The titanium carbide so produced and containing the residual chromium is superior to ordinary graphite-free titanium carbide in a number of respects. It is much tougher and harder. A sintered bar of the chrome-titanium-carbide will scratch a bar made of ordinary graphite-free titanium carbide. The color is silver white as against silver grey. The crystals of titanium carbide are large and well formed. As long as sufficient chromium is present, the stabilizing action due to volatility of the chromium-carbon complex is effective. In addition, the presence of chromium reduces or eliminates the reversible reaction which is a secondary source of free graphite. Finally, the third source of graphite, namely incomplete reaction, may be eliminated by proper attention to time temperature relations.

In the practice of the invention, we may use as raw material in the charge either natural rutile or brookite or, where extreme purity is required, we may use the chemically prepared titanium oxide of commerce. For all practical purposes, natural rutile is eminently suitable, particularly since modern methods of benefication allow the preparation of rutiles of high $TiO_2$ content.

If rutile containing chromium as an impurity be available, it may be effectively used in the practice of the invention by addition of sufficient chromium compound to bring the chromium content of the reaction mix up to the amount required to eliminate the free carbon.

For the purposes of our invention, the rutile is preferably ground to a fineness of about —325 mesh. As the source of carbon we prefer to use any low ash, low volatile type coke. This may be electric furnace carbon or calcined pitch coke, or calcined petroleum coke.

While chromium oxide is preferably employed in the reaction mix, a number of chromium compounds are satisfactory for our purposes such as the ammonium or alkali chromates and substantially any chromium compound not adversely affecting the properties of the titanium carbide may be employed. The simplest and most suitable material is the green pigment grade chromium oxide of commerce.

In the practice of our invention, we generally grind the ingredients together in a ball mill so that the ultimate particle size is such as to pass a 325 mesh screen. The dry, well mixed batch is then rammed into a graphite shell and the batch heated to a temperature range of 3600°–4000° F. so that this temperature range is maintained throughout the batch for at least 30 minutes but not over about 45 minutes, these times and temperatures being such as to engender the formation of TiC. The graphite shell completely encloses the reaction except for a small hole at the top to permit the escape of gases. After the reaction is complete, the source of heat is removed and the gas vent closed off to prevent oxidation. After cooling, the product is milled in an iron ball mill to —325 mesh and the slip treated with acid to remove iron, if any be present, washed with water and the product dried.

In the following examples, the batches were made up as indicated and heated to 3600° F. as rapidly as possible and then raised to 4000° F. in 30 minutes with the production of excellent grades of titanium-chromium carbide of great hardness and ductility in those instances where the added chromium in the mix was sufficient to reduce the free carbon to below 0.2%.

The rutile used in the examples listed in the table contained 96% $TiO_2$ and 0.34 $Cr_2O_3$. The total $Cr_2O_3$ content in the raw batch was the sum of the amount added and that present in the rutile. It will be understood that the examples are merely illustrative and not limitative of the invention.

| # Reaction | Reaction Mixtures | | | Theoretical Total Per Cent $Cr_2O_3$ in TiC formed | Per Cent Ti in TiC | Final Products | | |
|---|---|---|---|---|---|---|---|---|
| | g. Rutile | g. Coke | g. added $Cr_2O_3$ | | | Per Cent Total Carbon | Per Cent Free Carbon | Per Cent $Cr_2O_3$ |
| 1 | 809 | 362 | nil | nil | 78.7 | 18.82 | 1.05 | nil |
| 2 | 809 | 362 | nil | 0.47 | | | 0.97 | 0.15 |
| 3 | 809 | 362 | 6.0 | 1.48 | 78.3 | 18.28 | 0.11 | 0.88 |
| 4 | 162 | 72 | 2.4 | 2.40 | 76.5 | 18.31 | 0.06 | 1.44 |
| 5 | 324 | 145 | 9.6 | 4.40 | 76.3 | 17.58 | 0.04 | 3.21 |
| 6 | 162 | 72 | 7.2 | 6.46 | 75.4 | 17.18 | 0.08 | 3.67 |
| 7 | 162 | 72 | 9.6 | 8.51 | 76.0 | 17.23 | 0.05 | 3.22 |
| 8 | 162 | 72 | 12.0 | 10.42 | 76.1 | 16.90 | 0.08 | 3.19 |
| 9 | 162 | 72 | 14.5 | 12.62 | 72.5 | 18.30 | 0.11 | 5.61 |

We have found that at least 0.6% $Cr_2O_3$ and preferably 1.0% $Cr_2O_3$ by weight, based on the TiC to be formed, should be present in the raw mix to compensate for that lost in the reaction to obtain the beneficial results.

From a free carbon standpoint, the beneficial effects of the use of the proper amount of chromium is evident by comparison of reactions 1 and 2 with reactions 3 to 9. The final product should contain at least a few tenths of a percent of $Cr_2O_3$ and may contain up to several percent, the effect on elimination of free carbon being clearly evident when the raw batch contains an amount of $Cr_2O_3$ equivalent to about 1.5% of the TiC finally formed. In the absence of sufficient chromium as a constituent of the reaction mixture the free carbon elimination is erratic and uncontrollable.

It appears from reaction #3 that the raw batch should contain at least 1.0% $Cr_2O_3$ as a safe operating minimum, since 0.6% $Cr_2O_3$ was lost and since about 0.4% $Cr_2O_3$ should be retained. As appears from the table, last column, a content of about 3% of $Cr_2O_3$ in the final product, TiC, results in minimum free carbon content.

From the above, it will be seen that a procedure is provided whereby, as an initial product, a titanium carbide of graphite-free quality can be prepared provided the reaction batch of titanium oxide and carbon contains sufficient chromium to eliminate the graphite formed. The amount of chromium should be sufficient to provide a quantity remaining in the final titanium carbide to provide control over free carbon formations and for removal of a portion thereof as volatile chromium carbide. While we have indicated that about 1.0% $Cr_2O_3$ in the TiC is effective, departures from this figure may be made and are contemplated within the invention.

What is claimed is:

1. The method of manufacturing titanium carbide containing less than 0.2% graphite which comprises providing a mixture consisting of titanium dioxide and carbon in approximately stoichiometric proportions for titanium carbide reaction, and a compound of chromium existing as the oxide and forming carbide at the reaction temperature, said chromium compound being present in sufficient amount to form volatile chromium carbide with graphite formed in the titanium carbide and to provide a chromium content calculated as 0.88% to 3.67% $Cr_2O_3$, based on the titanium carbide reaction product, and firing said mixture to a reaction temperature of 3600° F. to 4000° F., whereby the titanium carbide produced contains less than 0.2% graphite, and chromium calculated as 0.88% to 3.67% $Cr_2O_3$.

2. Tough, hard and highly refractory titanium carbide containing graphite in an amount less than 0.2% and chromium, calculated as 0.88% to 3.67% $Cr_2O_3$, based on the titanium carbide.

CHARLES C. LAUGHLIN.
    EUGENE WAINER.

REFERENCES CITED

The following references are of record in the file of this patent:

UNITED STATES PATENTS

| Number | Name | Date |
|---|---|---|
| 2,119,489 | Beer | May 31, 1938 |
| 2,173,749 | Boecker et al. | Sept. 19, 1939 |

FOREIGN PATENTS

| Number | Country | Date |
|---|---|---|
| 478,016 | Great Britain | 1938 |